(12) United States Patent  (10) Patent No.: US 7,937,109 B2
Wilson  (45) Date of Patent: May 3, 2011

(54) CURRENT SOURCE DRIVER FOR COMMON GROUND SIGNAL INTERFACE

(75) Inventor: David F. Wilson, Soquel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 12/011,050

(22) Filed: Jan. 24, 2008

(65) Prior Publication Data

US 2009/0191911 A1   Jul. 30, 2009

(51) Int. Cl.
H04M 1/00 (2006.01)
H04M 1/725 (2006.01)

(52) U.S. Cl. .................. 455/557; 455/556.1; 455/556.2; 455/558; 455/559

(58) Field of Classification Search ............... 455/575.1, 455/575.2, 575.6, 90.3, 569.1, 569.2, 550.1, 455/557, 556.1, 556.2, 558, 559
See application file for complete search history.

(56) References Cited

U.S. PATENT DOCUMENTS

| | | | |
|---|---|---|---|
| 7,183,857 B2 | 2/2007 | Doy et al. | |
| 7,292,876 B2 | 11/2007 | Bosch et al. | |
| 7,373,169 B2 * | 5/2008 | Yoshino | 455/550.1 |
| 7,594,059 B2 * | 9/2009 | Townsend | 710/313 |
| 7,623,667 B2 * | 11/2009 | Sander et al. | 381/74 |
| 7,697,947 B2 * | 4/2010 | Wakefield | 455/502 |
| 7,715,874 B2 * | 5/2010 | Bjorklund | 455/557 |
| 2006/0222021 A1 * | 10/2006 | Ruff | 370/522 |
| 2007/0298845 A1 | 12/2007 | Knoedgen | |
| 2008/0126592 A1 * | 5/2008 | Townsend | 710/16 |
| 2008/0140902 A1 | 6/2008 | Townsend | |

OTHER PUBLICATIONS

APEX Microtechnology Corporation; "Voltage to Current Conversion", Application Note 13, Feb. 2007; pp. 1-3.

* cited by examiner

*Primary Examiner* — Tilahun Gesesse
(74) *Attorney, Agent, or Firm* — Foley & Lardner LLP

(57) ABSTRACT

A mobile computing device comprises a housing, a memory, a first current source driver, an audio interface and a processing circuit. The housing is configured to be held in a hand during use. The memory is configured to store audio data. The audio interface comprises a first terminal, a second terminal, and a common ground terminal for the first and second terminals. The processing circuit is configured to control the first current source driver to provide a first audio signal on the first terminal based on the audio data.

18 Claims, 7 Drawing Sheets

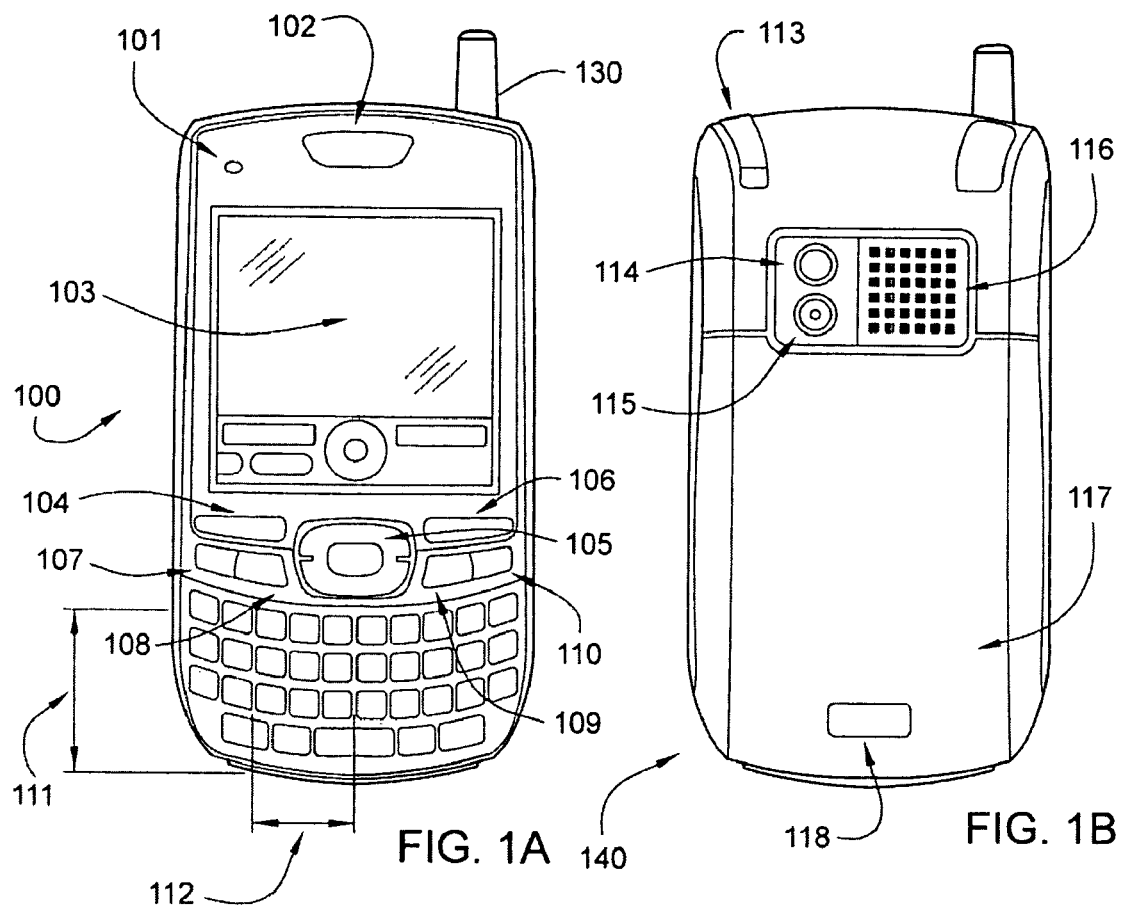
FIG. 1A   FIG. 1B
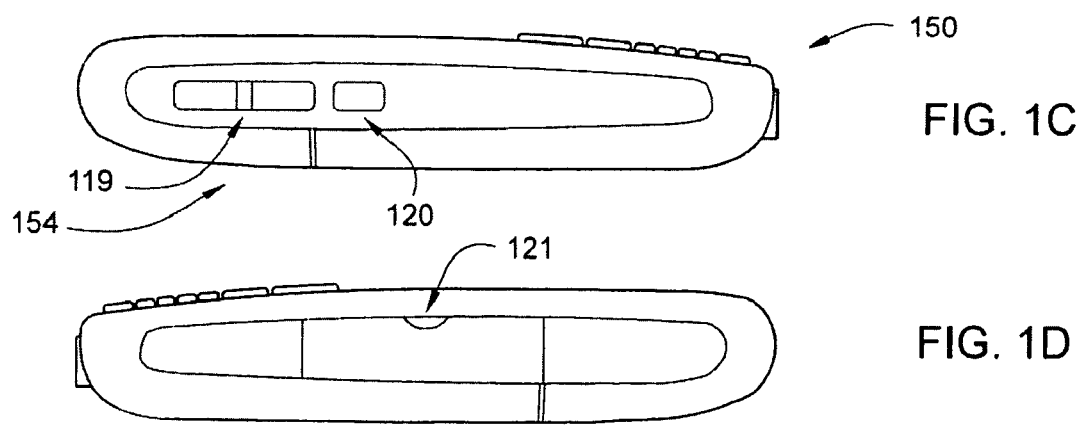
FIG. 1C
FIG. 1D
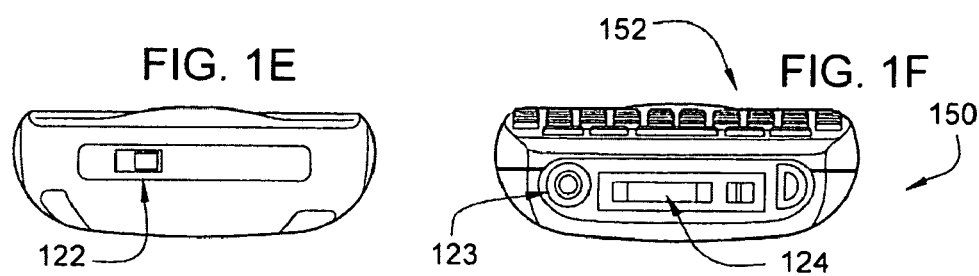
FIG. 1E   FIG. 1F

CURRENT SOURCE DRIVER FOR COMMON GROUND SIGNAL INTERFACE

BACKGROUND

Electronic circuits sometimes share wires to reduce pin count, failure modes, and cost. Some electronic circuits share a common ground terminal for two or more signals traveling from one portion of the circuit to another.

In one particular example, mobile computing devices operating according to the CEA-936A universal serial bus (USB) standard can share a ground terminal in certain configurations. The CEA-936A standard supports analog accessories such as telephony and multimedia headsets. Audio signals communicated between the mobile computing device and accessories share a ground terminal.

BRIEF DESCRIPTION OF THE DRAWINGS

FIGS. 1A through 1F illustrate a mobile computing device from various views, according to an exemplary embodiment;

DETAILED DESCRIPTION OF EXEMPLARY EMBODIMENTS

Figure 2:
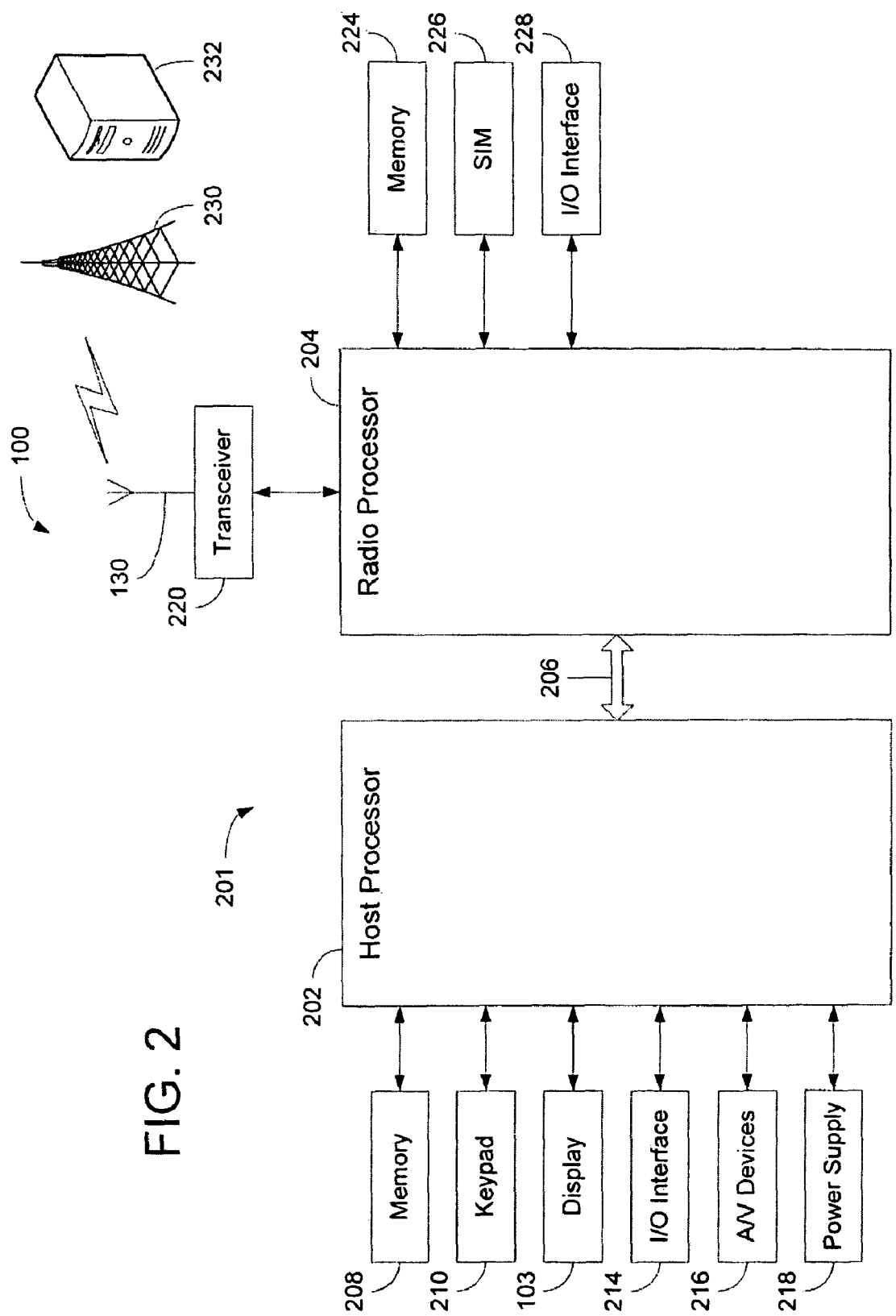
FIG. 2 is a block diagram of the mobile computing device of FIGS. 1A through 1F, according to an exemplary embodiment.

Described herein is a system and method for improving the quality of data signals transmitted between two electronic circuits sharing a common or same ground terminal. Described herein is also a system and method for improving the quality of audio data communicated between devices operating in accordance with the CEA-936A standard. Described herein is also a system and method for overcoming ground loop problems inherent in communication interfaces operating in accordance with the CEA-936A standard, in which audio and logic signals share a single, common ground connection.

Described herein is also a system and method for improving signal integrity and noise problems associated with electronic circuits sharing a common ground terminal for multiple data signals. Described herein is also a system and method for meeting audio quality needs associated with multimedia or compact disk (CD) quality requirements.

Described herein is also a system and method for a mobile computing device and/or a separate audio device in communication with the mobile computing device for improving audio sound quality for telephony, digital audio playing, multimedia, and other audio applications.

The teachings herein extend to those embodiments which fall within the scope of the appended claims, regardless of whether they accomplish one or more of the above-mentioned exemplary advantages.

Referring to FIGS. 1A through 1F, a mobile computing device 100 is shown from various angles, according to an exemplary embodiment. FIG. 1A is a front view of device 100; FIG. 1B is a rear view of device 100; FIGS. 1C and 1D are side views of device 100; and FIGS. 1E and 1F are top and bottom views of device 100. The device may be any type of communications or computing device (e.g., a cellular phone, other mobile device, digital media player (e.g., audio or audio/video), personal digital assistant, etc.).

Device 100 may be a smart phone, which is a combination mobile telephone and handheld computer having personal digital assistant ("PDA") functionality. The teachings herein can be applied to other mobile computing devices (e.g., a laptop computer) or other electronic devices (e.g., a desktop personal computer, etc.). PDA functionality can comprise one or more of personal information management, database functions, word processing, spreadsheets, voice memo recording, location-based services, device backup and lock, media playing, internet browsing, etc. and is configured to synchronize personal information (e.g., contacts, e-mail, calendar, notes, to-do list, etc.) from one or more applications with a computer (e.g., desktop, laptop, server, etc.). Device 100 is further configured to receive and operate additional applications provided to device 100 after manufacture, e.g., via wired or wireless download, Secure Digital card, etc.

Device 100 may be a handheld computer (e.g., a computer small enough to be carried in a typical front pocket found in a pair of pants or other similar pocket), comprising such devices as typical mobile telephones and PDAs, but the term "handheld" and the phrase "configured to be held in a hand during use" excluding typical laptop computers and tablet personal computers ("PCs") for purposes of this disclosure. In alternative embodiments, the teachings herein may extend to laptop computers, tablet PCs, desktop PCS, and other electronic devices. In some embodiments, the teachings herein may extend to any electronic device in which a CEA-936A standard is used, or to other electronic devices. The various input devices, audio circuits, and other devices of device 100 as described below may be positioned anywhere on device 100 (e.g., the front side of FIG. 1A, the rear side of FIG. 1B, the sides of FIGS. 1C and 1D, etc.).

Device 100 includes various user input devices therein. Examples of functions the user input devices may have include a send button 104 configured to select options appearing on display 103 and/or send messages, a 5-way navigator 105 configured to navigate through options appearing on display 103, a power/end button 106 configured to select options appearing on display 103 and to turn on display 103, a phone button 107 usable to access a phone application screen, a calendar button 108 usable to access a calendar application screen, a messaging button 109 usable to access a messaging application screen (e.g., e-mail, text, MMS, etc.), an applications button 110 usable to access a screen showing available applications, a thumb keyboard 111 (which includes a phone dial pad 112 usable to dial during a phone application), a volume button 119 usable to adjust the volume of audio output of device 100, a customizable button 120 which a user may customize to perform various functions, a ringer switch 122 usable to switch the device from one mode to another mode (such as switching from a normal ringer mode to a meeting ringer mode), and a touch screen display 103 usable to select control options displayed on display 103.

Device 100 also includes various audio circuits. The audio circuits may include phone speaker 102 usable to listen to information in a normal phone mode, external speaker 116 louder than the phone speaker (e.g. for listening to music, for a speakerphone mode, etc.), headset jack 123 to which a user can attach an external headset which may include a speaker and/or a microphone, and a microphone which can be used to pick up audio information such as the user's end of a conversation during a phone call.

Device 100 may also include a status indicator 101 that can be used to indicate the status of device 100 (such as messages pending, charging, low battery, etc.), a stylus slot 113 for receiving a stylus such as a stylus usable to input data on touch screen display 103, a digital camera 115 usable to capture images, a mirror 114 positioned proximate camera 115 such that a user may view themselves in mirror 114 when taking a picture of themselves using camera 115, a removable battery 118, and a connector 124 which can be used to connect device 100 to either (or both) an external power supply such as a wall outlet or battery charger or an external device such as a personal computer, a global positioning system ("GPS") unit, a display unit, or some other external device.

Device 100 may also include an expansion slot 121 which may be used to receive a memory card and/or a device which communicates data through slot 121, and a SIM card slot 117, located behind battery 118, configured to receive a SIM card or other card that allows the user to access a cellular network.

In various embodiments device 100 may include a housing 140. Housing 140 may be configured to hold a screen in a fixed relationship above a plurality of user input devices in a substantially parallel or same plane. In the fixed relationship embodiment, this fixed relationship excludes a hinged or movable relationship between the screen and plurality of keys in the fixed embodiment.

Housing 140 could be any size, shape, and dimension. In some embodiments, housing 140 has a width 152 (shorter dimension) of no more than about 200 mm or no more than about 100 mm. According to some of these embodiments, housing 140 has a width 152 of no more than about 85 mm or no more than about 65 mm. According to some embodiments, housing 140 has a width 152 of at least about 30 mm or at least about 50 mm. According to some of these embodiments, housing 140 has a width 152 of at least about 55 mm.

In some embodiments, housing 140 has a length 154 (longer dimension) of no more than about 200 mm or no more than about 150 mm. According to some of these embodiments, housing 140 has a length 154 of no more than about 135 mm or no more than about 125 mm. According to some embodiments, housing 140 has a length 154 of at least about 70 mm or at least about 100 mm. According to some of these embodiments, housing 140 has a length 154 of at least about 110 mm.

In some embodiments, housing 140 has a thickness 150 (smallest dimension) of no more than about 150 mm or no more than about 50 mm. According to some of these embodiments, housing 140 has a thickness 150 of no more than about 30 mm or no more than about 25 mm. According to some embodiments, housing 140 has a thickness 150 of at least about 10 mm or at least about 15 mm. According to some of these embodiments, housing 140 has a thickness 150 of at least about 50 mm. According to some embodiments, housing 140 has a thickness 150 of 11 mm or less.

In some embodiments, housing 140 has a volume of up to about 2500 cubic centimeters and/or up to about 1500 cubic centimeters. In some of these embodiments, housing 140 has a volume of up to about 1000 cubic centimeters and/or up to about 600 cubic centimeters.

Device 100 may include an antenna 130 system for transmitting and/or receiving electrical signals. Each transceiver of device 100 may include individual antennas or may include a common antenna 130. The antenna system may include or be implemented as one or more internal antennas and/or external antennas.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access ("CDMA") cellular radiotelephone communication systems, Global System for Mobile Communications ("GSM") cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service ("GPRS") systems ("GSM/GPRS"), CDMA/1xRTT systems, Enhanced Data Rates for Global Evolution ("EDGE") systems, Evolution Data Only or Evolution Data Optimized ("EV-DO") systems, etc.

Device 100 may be configured to provide voice and/or data communications functionality through wireless access points ("WAPs") in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network ("WLAN") system, wireless metropolitan area network ("WMAN") system, wireless wide area network ("WWAN") system (e.g., a cellular network), and so forth. Examples of suitable wireless network systems offering data communication services may include the Institute of Electrical and Electronics Engineers ("IEEE") 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network ("PAN") system, such as a Bluetooth® system operating in accordance with the Bluetooth Special Interest Group ("SIG") series of protocols.

As shown in the embodiment of FIG. 2, device 100 may comprise a processing circuit 201 which may comprise a dual processor architecture, including a host processor 202 and a radio processor 204 (e.g., a base band processor or modem). The host processor 202 and the radio processor 204 may be configured to communicate with each other using interfaces 206 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth.

The host processor 202 may be responsible for executing various software programs such as application programs and system programs to provide computing and processing operations for device 100. The radio processor 204 may be responsible for performing various voice and data communications operations for device 100 such as transmitting and receiving voice and data information over one or more wireless communications channels. Although embodiments of the dual processor architecture may be described as comprising the host processor 202 and the radio processor 204 for purposes of illustration, the dual processor architecture of device 100 may comprise one processor, more than two processors, may be implemented as a dual- or multi-core chip with both host processor 202 and radio processor 204 on a single chip, etc. Alternatively, a single processor or multiple processors may perform the functions of host processor 202 and radio processor 204, such as a single, unified processor that handles host and radio functions, or other multiprocessor topologies which do not rely on the concept of a host. Alternatively, processing circuit 201 may comprise any digital and/or analog circuit elements, comprising discrete and/or solid state components, suitable for use with the embodiments disclosed herein.

In various embodiments, the host processor 202 may be implemented as a host central processing unit ("CPU") using any suitable processor or logic device, such as a general purpose processor. The host processor 202 may comprise, or be implemented as, a chip multiprocessor ("CMP"), dedicated processor, embedded processor, media processor, input/output ("I/O") processor, co-processor, field programmable gate array ("FPGA"), programmable logic device ("PLD"), or other processing device in alternative embodiments.

The host processor 202 may be configured to provide processing or computing resources to device 100. For example, the host processor 202 may be responsible for executing various software programs such as application programs and system programs to provide computing and processing operations for device 100. Examples of application programs may include, for example, a telephone application, voicemail application, e-mail application, instant message ("IM") application, short message service ("SMS") application, multimedia message service ("MMS") application, web browser application, personal information manager ("PIM") application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface ("GUI") to communicate information between device 100 and a user.

System programs assist in the running of a computer system. System programs may be directly responsible for controlling, integrating, and managing the individual hardware components of the computer system. Examples of system programs may include, for example, an operating system ("OS"), device drivers, programming tools, utility programs, software libraries, an application programming interface ("API"), a GUI, and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless ("BREW") OS, JavaOS, a Wireless Application Protocol ("WAP") OS, and so forth.

Device 100 may comprise a memory 208 coupled to the host processor 202. In various embodiments, the memory 208 may be configured to store one or more software programs to be executed by the host processor 202. The memory 208 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory ("RAM"), dynamic RAM ("DRAM"), Double-Data-Rate DRAM ("DDRAM"), synchronous DRAM ("SDRAM)", static RAM ("SRAM"), read-only memory ("ROM"), programmable ROM ("PROM"), erasable programmable ROM ("EPROM"), electrically erasable programmable ROM ("EEPROM"), flash memory (e.g., NOR or NAND flash memory), or any other type of media suitable for storing information.

Although the memory 208 may be shown as being separate from the host processor 202 for purposes of illustration, in various embodiments some portion or the entire memory 208 may be included on the same integrated circuit as the host processor 202. Alternatively, some portion or the entire memory 208 may be disposed on an integrated circuit or other medium (e.g., hard disk drive) external to the integrated circuit of host processor 202. In various embodiments, device 100 may comprise a memory port or expansion slot 121 (shown in FIG. 1) to support a multimedia and/or memory card, for example. Processing circuit 201 may use memory port or expansion slot 121 to read and/or write to a removable memory card having memory, for example, to determine whether a memory card is present in port or slot 121, to determine an amount of available memory on the memory card, to store subscribed content or other data or files on the memory card, etc.

Device 100 may comprise a user input device 210 coupled to the host processor 202. The user input device 210 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad and so forth. Examples of such objects are shown in FIG. 1 as 5-way navigator 105, power/end button 106, phone button 107, calendar button 108, messaging button 109, applications button 110, thumb keyboard 111, volume button 119, customizable button 120, and ringer switch 122.

The host processor 202 may be coupled to a display 103. The display 103 may comprise any suitable visual interface for displaying content to a user of device 100. For example, the display 103 may be implemented by a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

Device 100 may comprise an I/O interface 214 coupled to the host processor 202. The I/O interface 214 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a PC. In various implementations, device 100 may be configured to transfer and/or synchronize information with the local computer system.

The host processor 202 may be coupled to various audio/video ("A/V") devices 216 that support A/V capability of device 100. Examples of A/V devices 216 may include, for example, a microphone, one or more speakers, an audio port to connect an audio headset, an audio coder/decoder (codec), an audio player, a digital camera, a video camera, a video codec, a video player, and so forth.

The host processor 202 may be coupled to a power supply 218 configured to supply and manage power to the elements of device 100. In various embodiments, the power supply 218 may be implemented by a rechargeable battery, such as a removable and rechargeable lithium ion battery to provide direct current ("DC") power, and/or an alternating current ("AC") adapter to draw power from a standard AC main power supply.

As mentioned above, the radio processor 204 may perform voice and/or data communication operations for device 100. For example, the radio processor 204 may be configured to communicate voice information and/or data information over one or more assigned frequency bands of a wireless communication channel. In various embodiments, the radio processor 204 may be implemented as a communications processor using any suitable processor or logic device, such as a modem processor or baseband processor. Although some embodiments may be described with the radio processor 204 implemented as a modem processor or baseband processor by way of example, it may be appreciated that the embodiments are not limited in this context. For example, the radio processor 204 may comprise, or be implemented as, a digital signal processor ("DSP"), media access control ("MAC") processor, or any other type of communications processor in accordance with the described embodiments. Radio processor 204 may be any of a plurality of modems manufactured by Qualcomm, Inc. or other manufacturers.

Device 100 may comprise a transceiver 220 coupled to the radio processor 204. The transceiver 220 may comprise one or more transceivers configured to communicate using different types of protocols, communication ranges, operating power requirements, RF sub-bands, information types (e.g., voice or data), use scenarios, applications, and so forth. For example, transceiver 220 may comprise a Wi-Fi transceiver and a cellular or WAN transceiver configured to operate simultaneously.

The transceiver 220 may be implemented using one or more chips as desired for a given implementation. Although the transceiver 220 may be shown as being separate from and external to the radio processor 204 for purposes of illustration, in various embodiments some portion or the entire transceiver 220 may be included on the same integrated circuit as the radio processor 204.

Device 100 may comprise an antenna system 130 for transmitting and/or receiving electrical signals. As shown, the antenna system 130 may be coupled to the radio processor 204 through the transceiver 220. The antenna system 130 may comprise or be implemented as one or more internal antennas and/or external antennas. Radio tower 230 and server 232 are shown as examples of potential objects configured to receive a signal from antenna system 130.

Device 100 may comprise a memory 224 coupled to the radio processor 204. The memory 224 may be implemented using one or more types of machine-readable or computer-readable media capable of storing data such as volatile memory or non-volatile memory, removable or non-removable memory, erasable or non-erasable memory, writeable or re-writeable memory, etc. The memory 224 may comprise, for example, flash memory and secure digital ("SD") RAM. Although the memory 224 may be shown as being separate from and external to the radio processor 204 for purposes of illustration, in various embodiments some portion or the entire memory 224 may be included on the same integrated circuit as the radio processor 204. Further, host processor 202 and radio processor 204 may share a single memory.

Device 100 may comprise a subscriber identity module ("SIM") 226 coupled to the radio processor 204. SIM 226 may comprise, for example, a removable or non-removable smart card configured to encrypt voice and data transmissions and to store user-specific data for allowing a voice or data communications network to identify and authenticate the user. SIM 126 also may store data such as personal settings specific to the user.

Device 100 may comprise an I/O interface 228 coupled to the radio processor 204. The I/O interface 228 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFLT") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFLT or AGPS/AFLT for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, the transceiver 220 and the antenna system 130 may comprise GPS receiver or transceiver hardware and one or more associated antennas coupled to the radio processor 204 to support position determination.

The host processor 202 may comprise and/or implement at least one location-based service ("LBS") application. In general, the LBS application may comprise any type of client application executed by the host processor 202, such as a GPS application configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest ("POI") such as restaurants, hotels, landmarks, and entertainment venues, and other types of LBS services in accordance with the described embodiments.

Radio processor 204 may be configured to invoke a position fix by configuring a position engine and requesting a position fix. For example, a position engine interface on radio processor 204 may set configuration parameters that control the position determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service ("QoS") values, optimization parameters (e.g., optimized for speed, accuracy, or payload), PDE address (e.g., IP address and port number of LPS or MPC), etc. In one embodiment, the position engine may be implemented as a QUALCOMM® gpsOne® engine.

Figure 3:
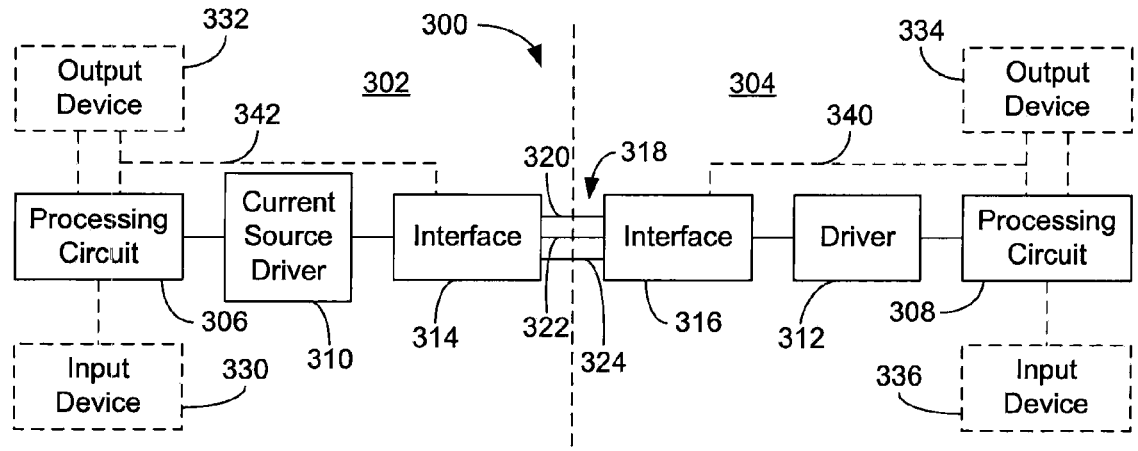
FIGS. 3-5 are block diagrams of circuits according to various exemplary embodiments.
Figure 4:
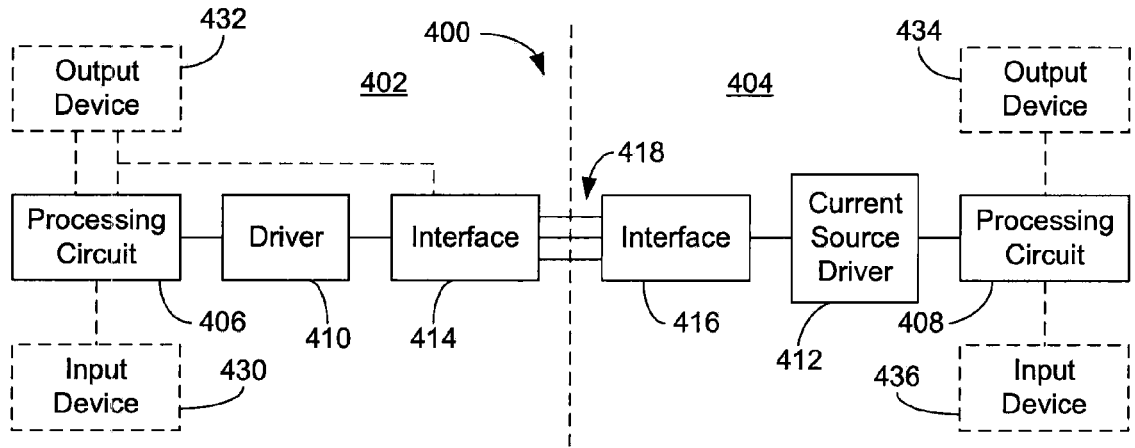
Figure 5:
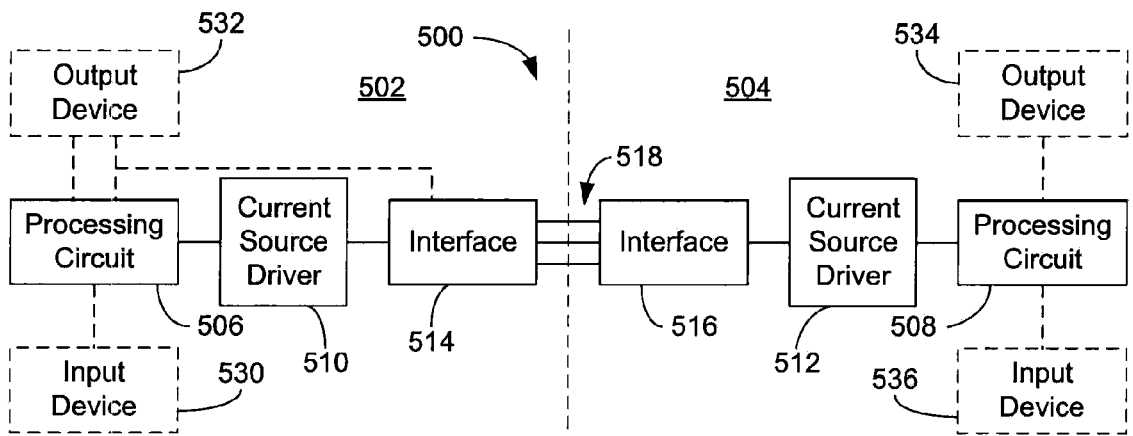

Referring to FIGS. 3-5, electronic systems are shown in three exemplary embodiments. In FIG. 3, an electronic system 300 comprises a first circuit 302 and a second circuit 304. Each of circuits 302, 304 comprise a respective processing circuit 306, 308, a driver 310, 312, and an interface 314, 316. Processing circuits 306, 308 may comprise any circuit components, analog and/or digital, analog-to-digital or digital-to-analog converters, etc., configured to perform functions, which may include any of the functions described above with reference to FIGS. 1-2, or other functions.

Figure 9:
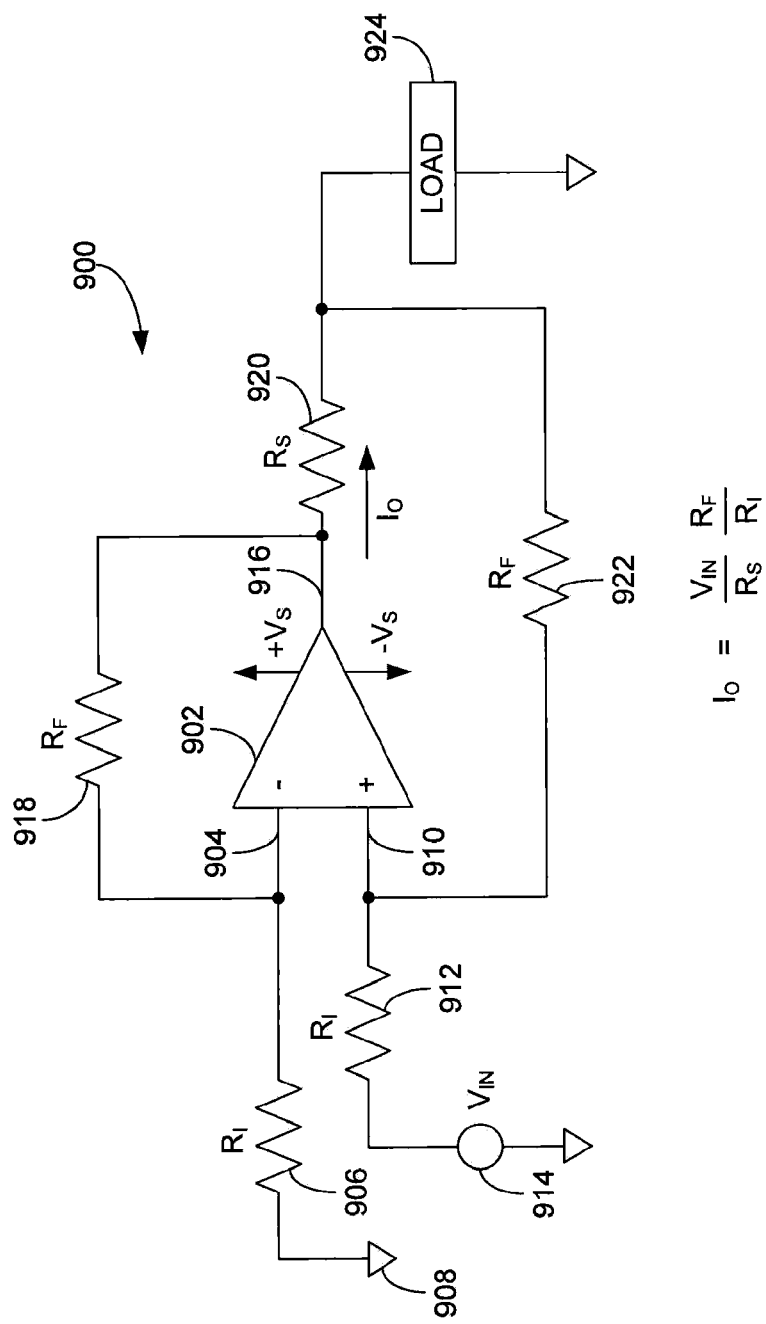
FIG. 9 is a circuit diagram of a current source driver, according to an exemplary embodiment.

In this embodiment, driver 310 comprises a current source driver as a power amplifier. Current source driver 310 may comprise any analog and/or digital components, such as an integrated circuit, operational amplifier, active and/or passive circuit components, etc. configured to generate a signal based on data from processing circuit 306. One exemplary circuit topology is shown in FIG. 9 using an Apex Precision Power PA07 power amplifier manufactured by Cirrus Logic, Tucson, Ariz., though alternative topologies and circuits, including topologies and circuits using discrete components, are contemplated. Current source drivers may be configured to drive a predetermined current signal to a load regardless of output resistance, other signals, or other resistances.

Interface 314 may comprise electrical and/or mechanical components configured to receive the signal from current source driver 310 and to provide the signal on a bus 318 to interface 316. Bus 318 may comprise any configuration and in this exemplary embodiment comprises at least two terminals or conductors 320, 324 sharing a common ground terminal or conductor 322 having a certain resistance (e.g., which may not be an ultra-low resistance). A second signal may be provided on a second terminal of bus 318, either from circuit 302 to circuit 304 or vice-versa. Both terminals 320, 324 share a common ground terminal 322, which can cause ground loop problems, ground level differences, crosstalk, voltage or resistance variations in the interface, loss of signal integrity, noise problems, signal leakage, etc. The use of current source driver 310 may alleviate one or more of these problems.

Circuits 302 and 304 may comprise a single device, be mounted in a single housing or on a single printed circuit board, or may be separate devices disposed within separate housings and coupled via bus 318 when in a wired configuration. In one exemplary embodiment, bus 318 may comprise an insulated wire coupled to interfaces 314 and 316 and extending at least six inches (or at least three inches, or some other length) from the interface 314 to interface 316. For example, circuit 304 may comprise an earpiece speaker accessory, circuit 302 may comprise a mobile computing device, and bus 318 may comprise a cable or wired connection or coupling between the accessory and mobile computing device for communicating audio data and/or signals in one or both directions. In another example, circuit 302 may comprise a digital music player comprising processing circuit 306 and a memory (not shown), wherein the memory is configured to store a digital music file and processing circuit 306 is configured to control current source driver 310 to generate signals based on audio data in the digital music file.

In various embodiments, circuit 302 may comprise an input device 330 and/or an output device 332 configured to receive signals from another system or a user and to provide signals to another system or a user, respectively. For example, input device 330 may comprise a microphone, keyboard, user input device, speech recognition circuit, touch screen, or other user input device. Further, input device 330 may comprise a communication interface, a network interface, a connector, a wire, a wireless transceiver, etc. Output device 332 may comprise a speaker (e.g., earpiece speaker for a telephone, speakerphone, etc.) configured to provide audio tones and/or signals, a display, tactile feedback (e.g., vibration), or other user output device. Further, output device 332 may comprise a communication interface, a network interface, a connector, a wire, a wireless transceiver, etc. Similarly, circuit 304 may also comprise an input device 336 and/or output device 334. Due to the many applications in which the circuits of FIGS. 3-5 may be used, many different types of input and/or output devices are contemplated.

In one exemplary embodiment, input device 330 comprises a wireless transceiver configured to receive telephony data over a cellular network from a remote device. Processing circuit 306 comprises a wireless telephony circuit configured to process wireless telephony data, to receive the telephony data, and to control current source driver 310 to output audio signals based on the telephony data to interface 314 for transmission on first terminal 320 to circuit 304. Circuit 304 may be configured to receive the signals at interface 316, which may be provided on bus 340 and amplified via processing circuit 308 and/or provided directly to output device 334 (e.g., an earpiece or headphone speaker). Output device 334 may comprise a load of a resistor (e.g., a single resistor without other load components) or other loads. The resistor or other load is configured to convert the current signal from current source driver 310 into a voltage signal, in a manner that may reduce the problems noted above.

In another embodiment, input device 336 may comprise a microphone configured to receive audible signals from a user or a nearby environment. Input device 336 is configured to generate electrical signals based on the audible signals and provide them to processing circuit 308. Processing circuit 308 is configured to control driver 312, which may comprise a voltage source driver, current source driver, or other driver circuit to provide the signals to interface 316 on second terminal 324 to interface 314. The signals may be provided on bus 342 to an amplifier within processing circuit 306 or directly to a load within output device 332 (again, e.g., a resistor or other load). Output device 332 may be configured to provide to convert the signals to data and to provide them as an output, for example, over a cellular network to a remote device.

In the embodiments of FIG. 3, driver 312 may not necessarily be a current source driver. However, in the alternative embodiments of FIG. 4, driver 412 may be a current source driver while driver 410 is not a current source driver. Further, in the alternative embodiments of FIG. 5, both drivers 510 and 512 are current source drivers. Certain advantages described herein can be realized by any of the various alternative embodiments disclosed in FIGS. 3-5. While the exemplary embodiments of FIGS. 3-5 have been described with reference to the communication of audio signals and data, the current source driver may also advantageously be applied to other signal transmission and/or reception applications. For example, the teachings herein may be applied to any application in which the number of conductors in a communication interface is constrained. As another example, the teachings herein may be applied to wire headsets which have a shared ground connection.

Figure 6:
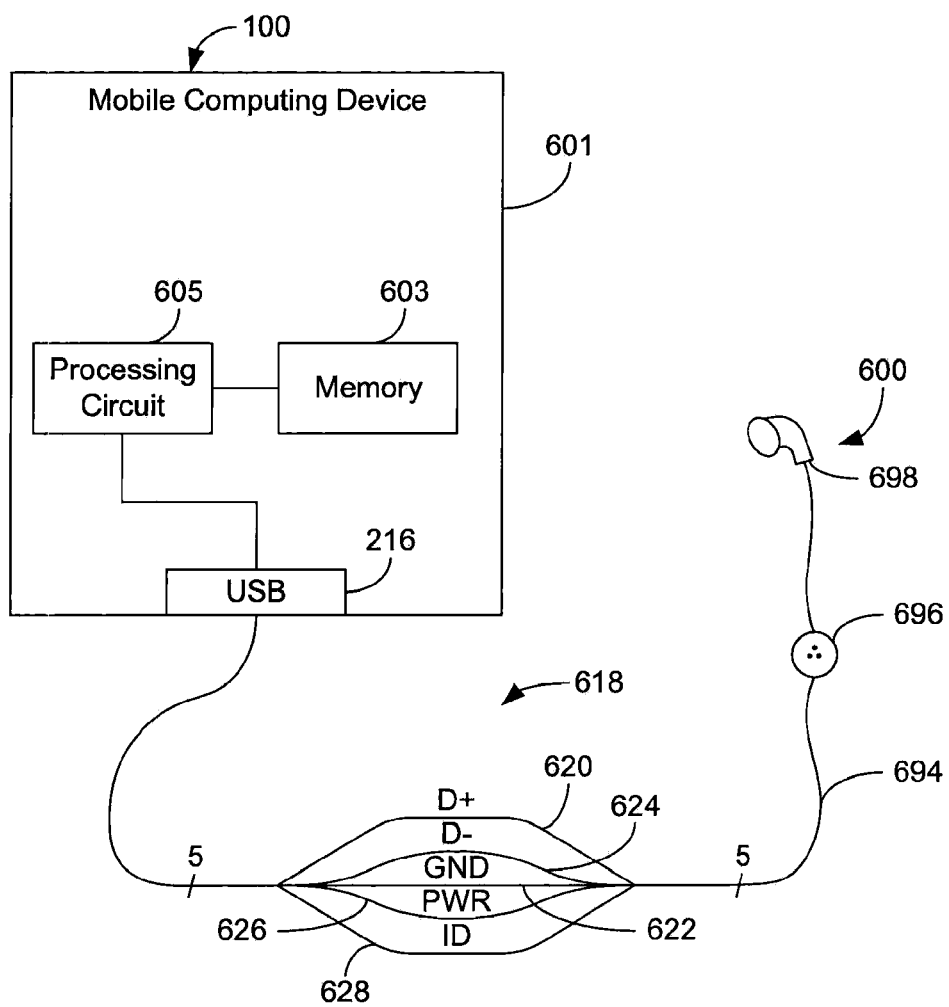
FIG. 6 is a block diagram of a mobile computing device and an audio accessory, according to an exemplary embodiment.

Referring now to FIG. 6, mobile computing device 100 is shown with an audio accessory unit 600, according to an exemplary embodiment. Accessory unit 600 may comprise one or more ear buds, headphones, earphones, stereo phones, headsets, hybrid headsets (a stereo headphone and a microphone) or other speaker units having one or more speaker units, and also may comprise a microphone or other audio sense element. Accessory unit 600 may be external to device 100 and may be an analog-only device or a device comprising analog and digital components and/or signals. Mobile computing device 100 may comprise any of the features and/or functions described above with reference to FIGS. 1-2, and device 100 and accessory unit 600 may further comprise circuitry in accordance with any of FIGS. 3-5. In this embodiment, device 100 comprises a housing 601 configured to be held in a hand during use, a memory 603, configured to store audio data (such as memory 208, 224 described with reference to FIG. 2) and a processing circuit 605 (such as processing circuit 201 described with reference to FIG. 2, and/or the processing circuits of FIGS. 3-5). The audio data may be an audio file, audio data received in real time from a remote source, such as during a telephone call, or audio data from any other source. Device 100 further comprises a current source driver and an audio interface 216. In this embodiment, audio interface 216 comprises a first terminal 620, a second terminal 624, and a common ground terminal 622 for first and second terminals 620, 624. Processing circuit 201 is configured to control first current source driver 310 to provide a first audio signal on first terminal 620 based on the audio data. In this embodiment, audio data may be provided from device 100 to audio accessory unit 600, and provided as an output from an earpiece speaker housing 698.

Processing circuit 306 of device 100 may be configured to receive a second audio signal on second terminal 624 from a separate microphone unit 696 over the wired connection or bus 618. The first and second audio signals provided on bus 618 may be of any type, such as analog, digital, pulse-width modulated (PWM), packet data, pulse-density modulated (PDM), pulse-code modulated (PCM), etc., which may be communicated by differential signaling (e.g., high speed serial differential, RS-422, RS-485, PCI Express, USB, etc.), single-ended signaling, or other signaling format. In one embodiment, the audio signals transmitted across the interface comprise analog signals to provide a lower-cost embodiment.

In this embodiment, bus 618 comprises two data terminals 620, 624, a common or shared ground terminal 622, a power terminal 626, and an identifier or ID terminal 628. In one exemplary embodiment, bus 618 operates according to or is compatible with a universal serial bus ("USB") standard. In another exemplary embodiment, bus 618 operates according to or is compatible with a CEA-936A standard. The CEA-936A standard (also known as a USB Carkit Specification) is a CEA (Consumer Electronics Association) standard allowing the use of a mini-USB connector for UART (Universal Asynchronous Receiver/Transmitter) and analog audio signals. CEA-936A may allow connection of a mobile phone to analog hands-free car kits, chargers, headsets of all types, RS-232 devices, and other devices. Reusing a USB connector on a mobile computing device for connection to headsets or other audio devices can be a low cost option for providing such communication. In some embodiments, using the USB port for analog or digital audio signals can obviate the need for a dedicated audio port, saving cost, physical space, and failure points.

From the mobile phone side, the USB D− wire 624 may be used as either the USB D− signal, the UART receive data signal, the left stereo speaker audio channel, or the mono speaker audio channel, and the USB D+ 620 wire may be used as either the USB D+ signal, the UART transmit data signal, the right stereo speaker audio channel, or the mono microphone audio channel. Data provided on ID wire 628 (e.g., by putting a different bearing impedance on ID wire 628, sending a data packet, etc.) may communicate which communication configuration is being used from one device to another. Power wire 626 allows a device such as device 100 to provide the power needed to operate unit 600.

Accordingly, the circuits of FIGS. 3-5 may operate in any of a plurality of embodiments or modes, such as 1) a headphone/microphone or earphone/microphone configuration in which earphone data is communicated on one of the D+ or D− wires and microphone data is communicated on the other of D+ or D− wires, 2) a stereo headphone or earphone configuration in which left audio is communicated on one of the D+ or D− wires and right audio is communicated on the other of the D+ or D− wires, 3) a stereo monotone configuration in which both D+ and D− wires communicate a single, monotone audio signal (e.g., to left and right speakers on a dual headphone accessory unit), 4) a switchable configuration in which device 100 and unit 600 may be configured to switch among any of configurations 1, 2, or 3 above in response to user inputs.

In embodiments 2) or 3) above, the second audio signal may be provided by a second current source driver in device 100. Alternatively, a second current source driver may be provided in device 100 and processing circuit 201 may be configured to control the second current source driver to provide the second audio signal to second terminal 624 based on audio data in a memory of device 100. In embodiment 2), the first and second audio signals provided by device 100 on data terminals 620 and 624 may comprise a stereo audio signal.

In one example of embodiment 4), processing circuit 201 is operable in a first mode to provide a stereo audio signal over first and second terminals 620, 624 and operable in a second mode to receive a second audio signal on second terminal 624 from a separate microphone unit 696 (i.e., separate from the housing of device 100) over a wired connection 694. Device 100 may be configured to receive a user selection of the first or second mode (or other modes) and to control bus 618 and audio unit 600 to carry out the switch of modes.

In an embodiment in which device 100 comprises a digital audio player circuit, processing circuit 201 may be configured in a synchronization mode to synchronize the audio data (e.g., one or more digital music files) stored in memory 208, 224 with a remote computer (e.g., a server on a cellular network, a desktop or laptop PC, a nearby digital audio player, etc.) using the audio interface 314. In a play mode, processing circuit 201 may be configured to provide audio signals to separate earphone speaker unit 600 over wired connection 694. Synchronization may comprise transmitting, receiving, or exchanging predetermined digital music files (or other data files) between device 100 and the remote computer, which can include uploading new data files to device 100.

In another exemplary embodiment, a microphone unit may comprise housing 696, a microphone (disposed within housing 696), an audio interface (such as interface 316, 416, or 516 of FIGS. 3-5) and current source driver (such as 412 or 512 in FIGS. 4-5). The audio interface may comprise first terminal 620, second terminal 624, and common ground terminal 622 for first and second terminals 620 and 624. The current source driver may be configured to receive an audio signal from the microphone and to generate a first signal based on the audio signal. The first signal may be provided on first terminal 620 to another circuit, such as device 100.

The microphone unit may further comprise an earphone speaker in the same or separate housing, such as earpiece speaker housing 698. In one embodiment, such as embodiment 1) above, the earphone speaker may be configured to receive an audio signal from the second terminal (typically from device 100 or another circuit providing the audio signal) and to provide an audio output (e.g., to a listener's ear) based on the audio signal. In another embodiment, a second earphone speaker may be provided which is configured in a first mode to receive the audio signal (e.g., for monotone audio) or in a second mode to receive stereo audio signals on the first and second terminals. Either the microphone unit or the device in communication with the microphone unit may be configured to switch the system from the first mode to the second mode, for example in response to inputs from a user to either device or in response to a request from an application operable on either device.

Figure 7:
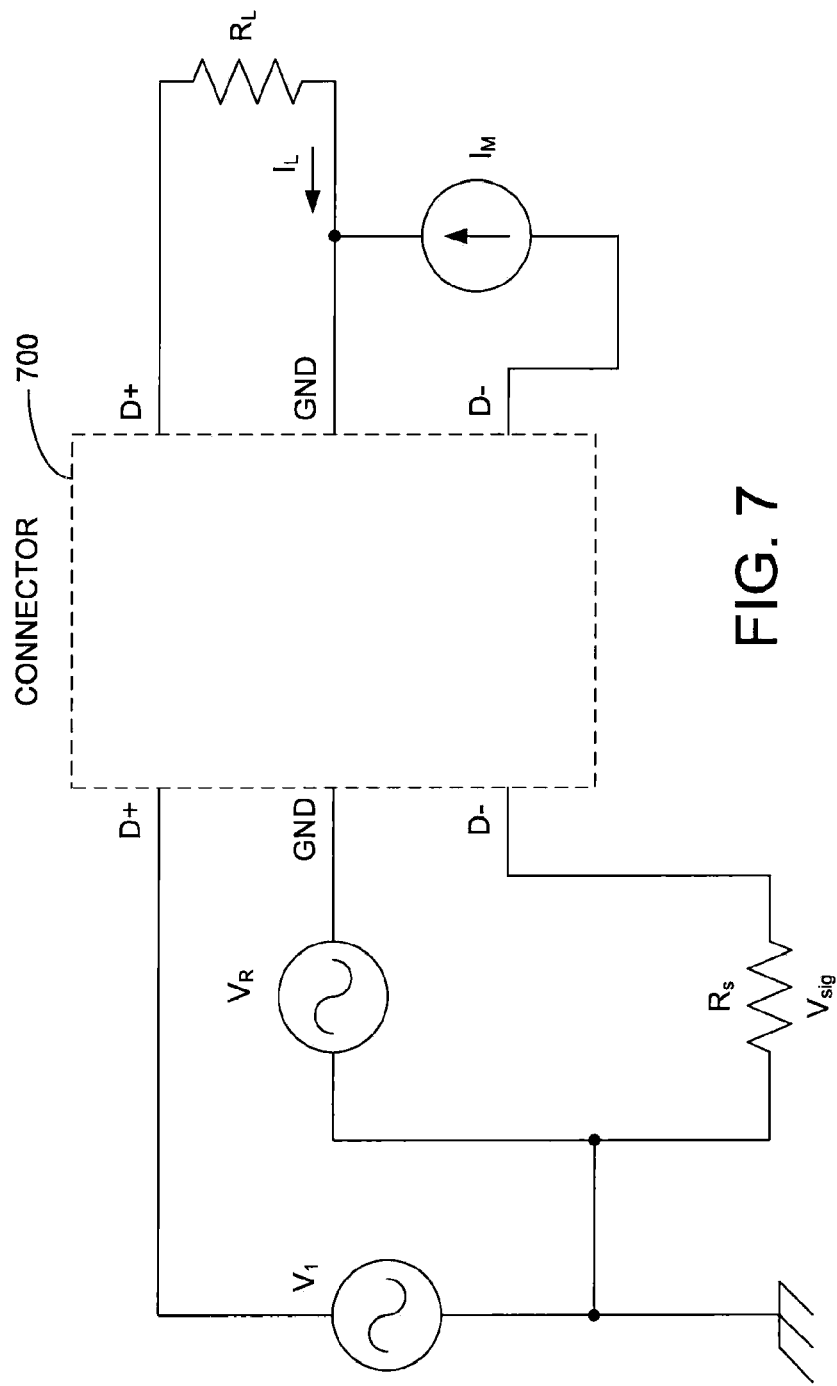
FIG. 7 is a circuit diagram showing a microphone unit having a current source driver, according to an exemplary embodiment.

Referring now to FIG. 7, an exemplary system and method for communicating audio between a mobile computing device and a microphone unit is shown. A connector 700 comprises D+terminal, D-terminal, and common ground terminal and may operate according to a CEA-936A communication standard. A voltage source driver signal generator $V_1$ is configured to transmit an audio signal to a headset load, $R_L$. An $I_L$ load current creates a $V_e$ error voltage in the resistance of the shared ground connection GND in connector 700.

A microphone current source driver $I_m$ is configured to transmit an audio signal via the D- terminal and the shared GND connection to load $R_S$ to create the $V_{sig}$ microphone signal, which is the amplified in the system. Because the microphone signal is created as a current source, only the $I_m$ microphone signal current flows through the $R_S$ load resistor. As a result, $V_{sig}$ consists only of the microphone load signal $I_m$ and the $V_e$ error voltage is ignored. In this embodiment, the use of a current source driver $I_m$ for the microphone signal avoids the effect of the $V_e$ error voltage, which could otherwise cause crosstalk problems if the microphone source driver were a voltage source or other configuration. Specifically, the use of a current source driver $I_m$ can avoid an echo situation in telephony applications in which any signal sent to the headset load $R_L$ is echoed back to the sender via the error signal $V_e$ created through the shared GND terminal.

Figure 8:
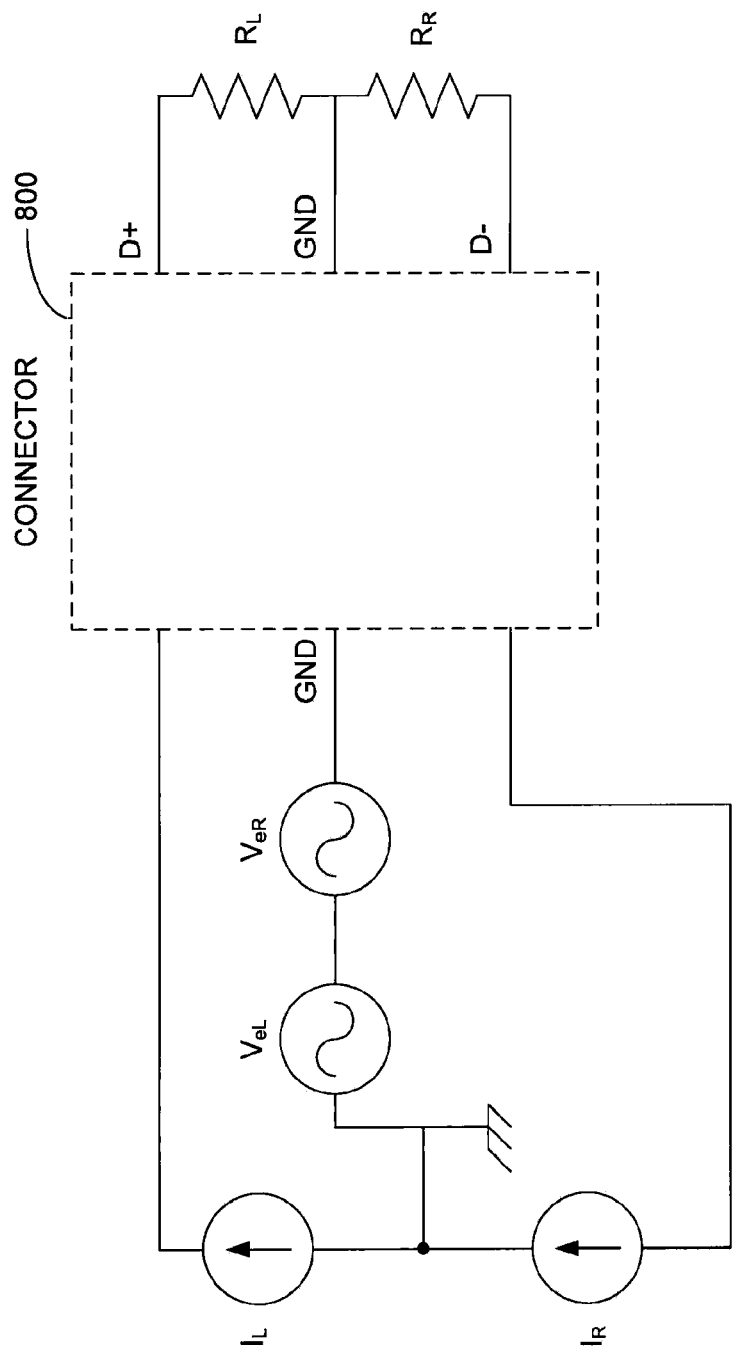
FIG. 8 is a circuit diagram showing a mobile computing device having current source drivers, according to an exemplary embodiment.

Referring now to FIG. 8, in this embodiment, D+ and D- terminals of connector 800 may be used to send Left and Right audio signals, respectively to load resistors $R_L$ and $R_R$, which may coupled to additional circuitry, such as one or more voltage amplifiers. As described above, the audio signals may be monotone, stereo, or other audio signals. From the perspective of the load resistor $R_L$, the left audio signal develops an error signal $V_{eL}$, which is a small loss of signal to $R_L$, and the right audio signal develops an error signal $V_{eR}$, which is a crosstalk signal, because of the resistance of the shared ground GND. From the perspective of the load resistor $R_R$, the left audio signal develops an error signal $V_{eL}$, a crosstalk signal, and the right audio signal develops an error signal $V_{eR}$, which is a small loss of signal, through the resistance of the shared ground connection GND. However, because the left and right audio signals are generated by left and right current source drivers $I_L$ and $I_R$, respectively, the resulting signals avoid the small losses and crosstalk signals. The power delivered to load resistor $R_L$ is $P_L=I_L^2*R_L$, which avoids the small loss of signal $V_{eL}$ and the crosstalk associated with $V_{eR}$. The power delivered to load resistor $R_R$ is $P_R=I_R^2*R_R$, which avoids the small loss of signal $V_{eR}$ and the crosstalk associated with $V_{eL}$.

Reducing crosstalk can provide embodiments in which a crosstalk level of greater than about −80 dB or greater than about −120 dB is achieved, which can be suitable for a quality stereo system.

For example, in prior systems, if $R_L$ is 8 Ohms and the connector resistance is 0.08 Ohms, crosstalk of approximately −40 dB level could result, which is about 40 dB louder than a desired minimum. The embodiment of FIG. 8 can help achieve crosstalk levels more suitable for quality audio applications.

In the embodiment of FIG. 7, use of a current driver source for the microphone signal can provide particularly advantageous results because of the relatively large amount of current flowing in the headphone load $R_L$ relative to the smaller signal voltage available from the microphone. Further, even a small amount of crosstalk into the microphone path can be easily heard as echo by a remote signal source originating the headphone signal (e.g., a far end talker on a cell phone, land line, etc.). This is caused by the signal from the remote signal source being passed into the load $R_L$, which also creates a $V_e$ error signal. If this error signal is amplified conventionally, $V_e$ is combined with the microphone signal resulting in the far end signal being returned back to the far end, resulting in an echo as experienced by the far end.

According to some exemplary embodiments, the circuits described herein may implement variants on a CEA-936A standard and still be compatible with the standard. For example, in the embodiment of FIG. 8, using current source drivers $I_L$ and $I_R$ would still result in a device compatible with headsets operating in accordance with a CEA-936A standard. Also, a CEA-936A-compatible headset would work similarly when driven by the current source driver as it would in other embodiments, provided that the external headset load resistance $R_L$ is standardized. In other words, provided $R_L$ is the nominal load impedance specified by the industry in the context of CEA-936A, the current source driver can be set to a nominal drive level such that the load will be driven the same amount as it would be with the voltage driver intended by the CEA-936A standard. In this manner, this embodiment would be functionally compatible with an external device operating in accordance with the CEA-936A standard. In the embodiment of FIG. 7, the microphone current source driver $I_m$ would provide a signal suitable for a CEA-936A-compatible host/receiving device, provided that the resistive load on the host side of the connector was an appropriate value. The resistive load $R_S$ could be an appropriate value if the signal levels are within about 3 dB of those intended by the CEA-936A standard and noise/crosstalk are not greater than what would exist had the external device been attached to a host configured according to the existing CEA-936A standard.) Load resistance $R_S$ could be configured to provide the appropriate value for a fully harmonized upgrade to CEA-936A.

The embodiments of FIGS. 7 and 8 may be combined to realize advantages of both embodiments. Alternatively, the embodiments of FIG. 7 or 8 may be implemented individually to realize certain advantages.

FIG. 9 is a circuit diagram of an exemplary current source driver 900. Driver 900, called an "Improved Howland Current Pump," operates as a voltage controlled current source and comprises an operational amplifier 902, such as part number PA07 manufactured by Cirrus Logic. An inverting input 904 is coupled through a resistor 906 to a ground 908. A noninverting input 910 is coupled through a resistor 912 to a signal input voltage source 914 which may be provided by a processing circuit in any of the embodiments described herein. An output 916 is coupled through a feedback resistor 918 to inverting input 904. Current through a resistor 920 defines an output current sent through a feedback resistor 922 to noninverting input 910 and to the load 924. Driver 900 is a differential amplifier which senses both input signal and feedback differentially. Input resistors 912 and 914 are closely resistance matched. Feedback resistors 918 and 922 are closely resistance matched. Alternative current source drivers, such as fully integrated drivers with inherent resistor matching, are contemplated.

With reference to the disclosure and claims, use of the phrase "based on" means "based at least in part on," and use of the term "a," "an" or "one" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the Figs., and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device, comprising:
   a housing configured to be held in a hand during use;
   a memory configured to store audio data;
   a first current source driver;
   an audio interface comprising a first terminal, a second terminal, and a common ground terminal for the first and second terminals; and
   a processing circuit configured to control the first current source driver to provide a first audio signal on the first terminal based on the audio data,
   wherein the first audio signal provided by the first current source driver comprises a current signal and an error voltage resulting from the common ground terminal does not substantially affect the current signal.

2. The mobile computing device of claim 1, further comprising a second current source driver, wherein the processing circuit is configured to control the second current source driver to provide a second audio signal to the second terminal based on the audio data, wherein the first and second audio signals provide a stereo audio signal.

3. The mobile computing device of claim 1, wherein the processing circuit is configured to receive a second audio signal on the second terminal from a separate microphone unit over a wired connection.

4. The mobile computing device of claim 1, wherein the processing circuit is operable in a first mode to provide a stereo audio signal over the first and second terminals and operable in a second mode to receive a second audio signal on the second terminal from a separate microphone unit over a wired connection.

5. The mobile computing device of claim 1, wherein the audio interface is compatible with a universal serial bus standard.

6. The mobile computing device of claim 5, wherein the audio interface is compatible with a CEA-936A standard.

7. The mobile computing device of claim 1, wherein the processing circuit is configured to control the first current source driver to provide the first audio signal to a separate earphone speaker unit over a wired connection.

8. The mobile computing device of claim 1, wherein the mobile computing device comprises a digital music player and the audio data comprises a digital music file.

9. The mobile computing device of claim 1, wherein the mobile computing device comprises a wireless telephone and the audio data comprises wireless telephony data.

10. The mobile computing device of claim 1, wherein the processing circuit is configured in a first mode to synchronize the audio data with a remote computer using the audio interface and in a second mode to provide the first audio signal to a separate earphone speaker unit over a wired connection.

11. An electronic system, comprising:
    a current source driver configured to generate a first signal;
    an interface comprising a first terminal, a second terminal, and a common ground terminal for the first signal and a second signal, wherein the interface is configured to provide the first signal on the first terminal to a receiver; and
    a mobile telephony circuit and a processing circuit configured to control the current source driver to generate the first signal based on telephony data,
    wherein the first signal generated by the current source driver comprises a current signal and an error voltage resulting from the common ground terminal does not substantially affect the current signal.

12. The electronic system of claim 11, further comprising an earpiece speaker, a microphone, and a processing circuit, wherein the processing circuit is configured to control the current source driver to generate the first signal based on signals received by the microphone.

13. The electronic system of claim 12, further comprising an insulated wire coupled to the interface of the earphone speaker and extending at least six inches from the interface to a second interface associated with a mobile computing device.

14. The electronic system of claim 11, further comprising a digital music player comprising a processing circuit and a memory, wherein the memory is configured to store a digital music file and the processing circuit is configured to generate the first signal based on audio data in the digital music file.

15. A microphone unit, comprising:
    a housing;
    a microphone;
    an audio interface comprising a first terminal, a second terminal, and a common ground terminal for the first and second terminals;
    a current source driver configured to receive an audio signal from the microphone and to generate a first signal based on the audio signal; and
    an earphone speaker configured to receive a second audio signal from the second terminal and to provide an audio output based on the second audio signal,
    wherein the first signal generated by the current source driver comprises a current signal and an error voltage resulting from the common ground terminal does not substantially affect the current signal.

16. The microphone unit of claim 15, further comprising a second earphone speaker configured in a first mode to receive the second audio signal and in a second mode to receive stereo audio signals on the first and second terminals.

17. The microphone unit of claim 15, wherein the audio interface is compatible with a universal serial bus standard.

18. The microphone unit of claim 17, wherein the audio interface is compatible with a CEA-936A standard.

* * * * *